United States Patent [19]

Kubota et al.

[11] Patent Number: 4,541,605

[45] Date of Patent: Sep. 17, 1985

[54] METAL MOLD DEVICE

[75] Inventors: Kazuho Kubota; Masao Todoroki, both of Tochigi, Japan

[73] Assignee: Daiichi-Geyer Kabushiki Kaisha, Japan

[21] Appl. No.: 579,997

[22] Filed: Feb. 14, 1984

[30] Foreign Application Priority Data

Feb. 16, 1983 [JP] Japan ............................ 58-24385

[51] Int. Cl.$^4$ .................. B29F 1/14; B29D 15/00; B29C 7/00
[52] U.S. Cl. ................................ 249/142; 425/438; 425/DIG. 58; 249/59; 249/178; 249/180; 249/184
[58] Field of Search ....... 425/438, 457, 393, DIG. 58; 249/59, 68, 178, 180, 142, 144

[56] References Cited

U.S. PATENT DOCUMENTS

| 3,339,242 | 9/1967 | Lamb | 249/180 X |
| 3,482,815 | 12/1969 | Naturale | 425/457 X |
| 3,677,684 | 7/1972 | Platz | 425/393 |
| 4,019,711 | 4/1977 | Altenhof et al. | 425/DIG. 58 |
| 4,286,766 | 9/1981 | von Holdt | 249/184 X |

Primary Examiner—J. Howard Flint, Jr.
Attorney, Agent, or Firm—Kane, Dalsimer, Kane, Sullivan and Kurucz

[57] ABSTRACT

Present invention relates to a metal mold device comprising a female die, a die frame having a hole and a male die assembly moving along an axis of the hole to produce a plastic molding having an opening with a partially waved inner sidewall. The male die assembly comprises a generally upwardly tapering central base having a rectangular top and four side slopes, a pair of opposed primary slide members and a pair of opposed auxiliary slide members. The primary slide members are strictly mounted on the opposed side slopes respectively while the auxiliary slide members are loosely mounted on the remained opposed side slopes respectively.

7 Claims, 12 Drawing Figures

METAL MOLD DEVICE

FIELD OF THE INVENTION

This invention relates to a metal mold device which is used to produce an injection molding having an opening in which an inner sidewall of the opening is partially ribbed and/or recessed.

PRIOR ART

Heretofore, it is well known that a metal mold device produces a plastic molding having an opening whose inner surface provides threads, projections, inward grooves, a concave hole, a hollow portion or a through hole.

For example, it is known that a metal mold device comprises an upper die which provides a profile of a plastic molding, and a lower die assembly which provides an opening of the molding with a partially ribbed inner sidewall upon assembling and then collapsed so as to easily remove the finished molding from the mold device. The lower die assembly therefore comprises six sector members which when assembled provide a cylindrical die and an upwardly tapering central base. Each sector member is so movably mounted on the base that when the base moves relative to the sectors, the sector members radially move to reduce the outer diameter of the cylindrical die.

This conventional metal mold device has disadvantages that the operation is difficult and that the design thereof meets with difficulty as used for producing a injection molding.

SUMMARY OF THE INVENTION

It is therefore an object of this invention to provide a metal mold device in which synthetic resin is injected in a space among an upper or female die, a die frame and a lower or male die assembly to produce a plastic molding ring or cap having an opening or blind hole with a convexo-concave inner sidewall.

The male die assembly is inserted through an opening of the die frame to protrude effective surfaces beyond the plane of the die frame and moved along an axis of the opening. While the female die is moved along the axis to contact with the frame to provide a space within the female die, the die frame and the male die assembly. After thermosetting the plastic in the space, the male die assembly is disassembled into a central base and four die members so that the finished molding is easily removed from the male die assembly.

According to the present invention, there is provided a metal mold device which comprises a female die for providing a profile of a molding, a die frame having an opening and a divisional male die assembly moving along an axis of the opening, characterized in that the divisional male die assembly comprises:

a central base having a rectangular top, four side slopes each opposed pair having common individual gradient angles or an identical angle relative to the axis and a bottom, said base being moved between a molding position and a removing position along the axis of the opening;

a pair of opposed primary slide members strictly movably mounted on the opposed corresponding side slopes of the base respectively in parallel to the axis of the opening;

a pair of opposed auxiliary slide members loosely movably mounted on the remained slide slopes of the base respectively in parallel to the axis of the opening;

central support means for carrying the central base and conventionally secured on the bottom of the base;

primary support means for carrying the primary slide members along the axis; and auxiliary support means for carrying the auxiliary slide members along the axis.

The central base and the slide members are so arranged that the rectangular top of the base is aligned with the respective top of the slide members to produce a bottom of the molding cap or to contact a bottom of the female die and that each sidewall of the slide members is aligned with that of the adjacent slide member so as to produce an inner sidewall of the molding ring or cap havng convexo-concave surface upon assembling.

After producing and thermosetting the synthetic molding in the space, when the central support means for carrying the central base moves along the axis to the intermediate position from the molding position, the opposed primary slide members inwardly moves perpendicular to the axis until the outer sidewall portions of the slide members having maximum diameter cannot touch the corresponding inner sidewall portions of the finished molding having minimum diameter.

Maintaining the central base at that position, the movement of the primary support means along the axis from the molding position causes the primary slide members to outwardly radially move along the axis to clear the inner sidewall of the plastic molding.

The central base further moves from the intermediate position to the removing position, the opposed auxiliary slide members inwardly moves perpendicular to the axis until the outer sidewall portions of the auxiliary slide members having maximum diameter cannot touch the corresponding inner sidewall portions of the finished molding having minimum diameter.

Then the auxiliary slide members is outwardly radially moved along the axis by movement of the auxiliary support means along the axis in order to clear the inner side wall of the plastic molding.

Another aspect of the invention is that a molding having a blind hole with a grooved inner sidewall, can be easily removed from a male die even if nominal diameter of the sidewall adjacent to a rim thereof is smaller than that of the sidewall adjacent to the bottom. Therefore, the male die assembly of the central base, and the primary and auxiliary slide members is so disposed that the movement of the base along an axis Z is converted with sequential 3 dimensional movements of the slide members, that is, a movement of the primary slide members along an axes X and Z, and a movement of the auxiliary slide members along axes Y and Z.

The principles of the invention will be further discussed with reference to the drawings wherein preferred embodiments are shown. The details illustrated in the drawings are intended to exemplify, rather than limit, aspects of the invention as defined in the claim.

BRIEF DESCRIPTION OF THE DRAWINGS

FIG. 7b is a sectional side view of a molding produced with the metal molded device shown in FIG. 7a;

FIG. 8b is a sectional side view of a molding produced with the metal molded device shown in FIG. 8a;

FIG. 9b is a sectional side view of a molding produced with the metal molded device shown in FIG. 9a.

DESCRIPTION OF THE PREFERRED EMBODIMENT

Figure 1:
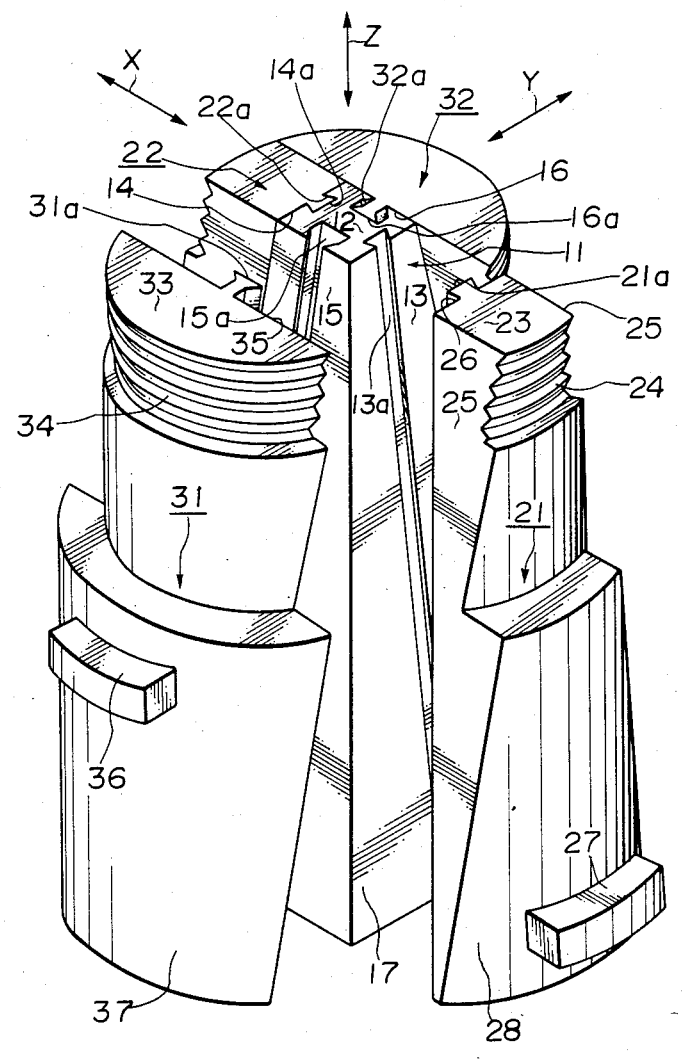
FIG. 1 is a partially exploded perspective view of a first embodiment of the metal mold device in accordance with the present invention for producing a plastic molding having a generally cylindrical opening with threaded sidewall, without the female die.
Figure 2:
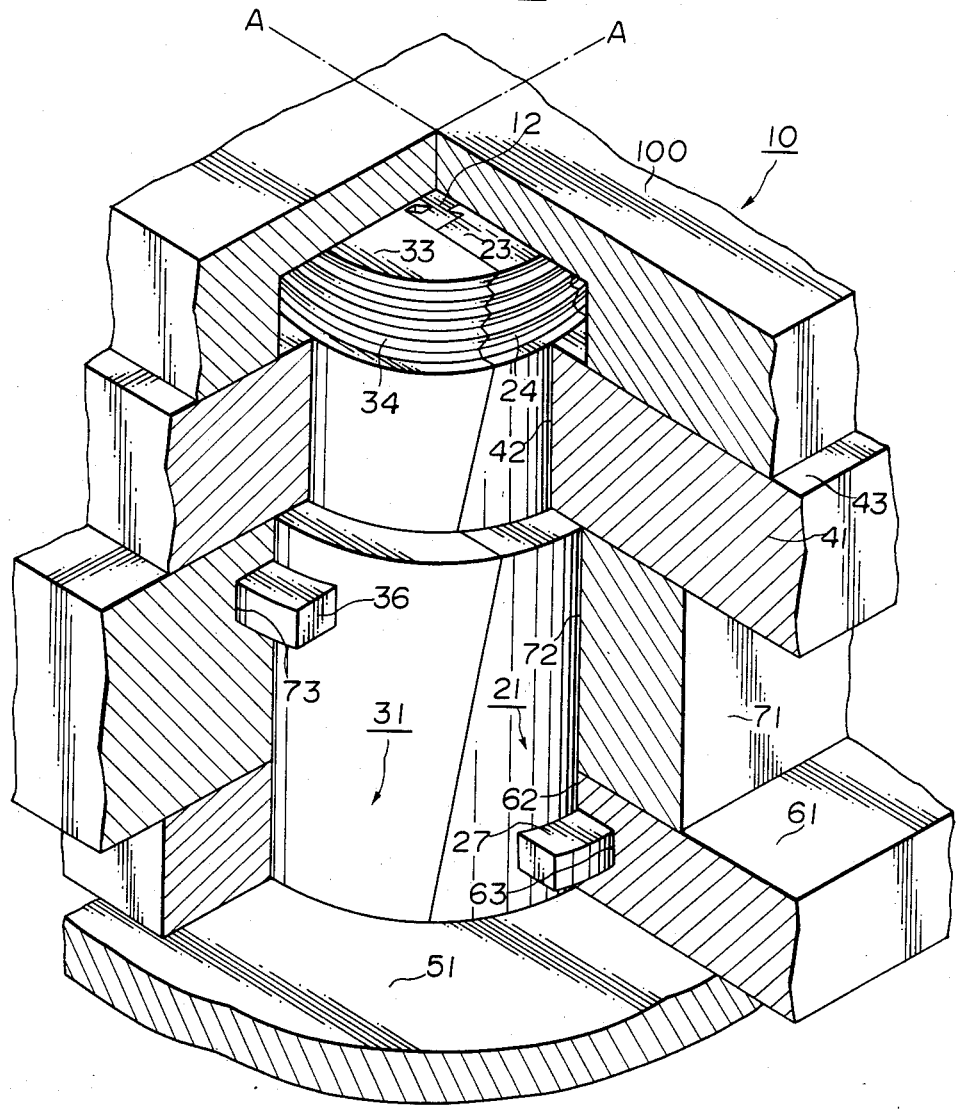
FIG. 2 is a partially quarter sectional perspective view of the metal mold device shown in FIG. 1 to show the interior male die assembly.
Figure 3:
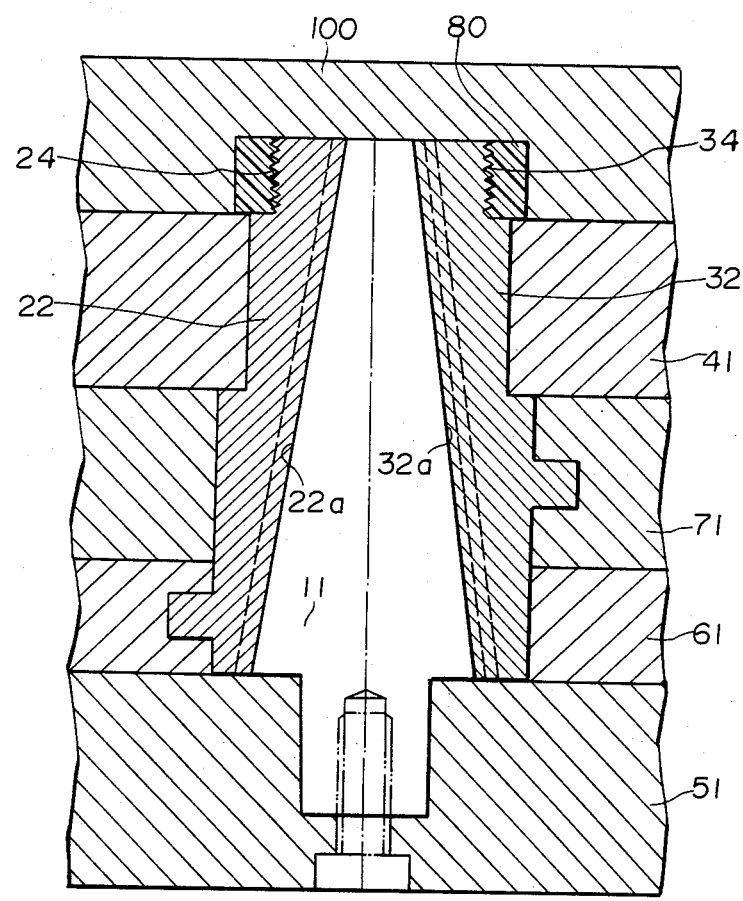
FIG. 3 is a sectional side view of the male die taken along the line A—A, of the FIG. 1.

In FIGS. 1 to 3 there is shown a first embodiment of a metal mold device 10 according to the present invention which comprises a female die 100 which provides a profile of the finished molding and a male die assembly which includes a vertically movable central truncated pyramid or base 11, a pair of radially and vertically movable primary slide members 21 and 22, a pair of perpendicularly radially and vertically movable auxiliary slide members 31 and 32.

As shown in FIGS. 2 and 3, the die assembly of the slide members 21, 22, 31 and 32 and the truncated pyramid 11 is inserted through a bore 42 of the die frame 41 so that the threaded portions 24 and 34 protrude beyond an upper horizontal plane 43 of the frame 41.

The vertically movable central base 11 has a horizontal square cross section.

The central base 11 therefore comprises a square top 12, a pair of upwardly tapering primary side slopes 13 and 14 inclined with a common predetermined angle to coverge toward a first upper virtual line and extending perpendicular to the X-axis, a pair of upwardly tapering secondary side slopes 15 and 16 inclined with the common predetermined angle to converge toward a second upper virtual line and extending perpendicularly to the Y-axis and a bottom 17 threadedly secured on a central support means 51.

Grooves or wedges 13a and 14a each having a trapezoid cross section are provided on the primary slopes 13 and 14 of the base 11 respectively and extended along the Z-axis.

Similarly, loose grooves or wedges 15a and 16a each having a combination of rectangular and trapezoid cross sections are provided on the secondary slopes 15 and 16 of the base 11 respectively and extended along the Z-axis.

The primary slide members 21 and 22 are so mounted on the respective slopes 13 and 14 that the grooves 13a and 14a are strictly engaged into projection rails 21a and 22a respectively. Each of the projection rails 21a and 22a has a trapezoid cross section.

The auxiliary slide members 31 and 32 are so mounted on the respective side slopes 15 and 16 that the loose grooves 15a and 16a are loosely engaged into projection rails 31a and 32a respectively. Each of the loose projection rails 21a and 22a has a combination of rectangular and trapezoid cross section.

Accordingly, each of the auxiliary slide members 31 and 32 comprises a generally arcuate top 33, a partial cylindrical sidewall 34 which provides a part of the inner sidewalls of the finished molding ring or pipe, slide contact plane 35 sliding on the corresponding side slopes 15 and 16 a projection 36 keyed into the corresponding grooves 73 of the auxiliary support means 71 and a bottom 37.

Similarly, each of the primary slide members 21 and 22 comprises a generally rectangular arcuate top 23, a partial cylindrical sidewall 24 for providing another part of the inner sidewall of the finished molding, contact side slopes 25 and 25 each contacting the adjacent slide contact plane 35 of corresponding slide members 31 and 32, slide contact plane 26 sliding on the corresponding slopes 13 and 32 and a projection 27 keyed into corresponding grooves 63 of the support means 61 and a bottom 28.

In FIG. 1 the slide members 21 and 31 are shown as separated members to clarify the configuration thereof.

In FIG. 2 the female die 100, the frame 41, the central, primary and auxiliary support means 51, 61 and 71 are partially cut away to show the assembly of the base 11 and slide members 21, 22, 31 and 32.

Disposed under the die frame 41 is the auxiliary support means 71 having a coaxially disposed bore 72 and diametrically disposed concave grooves 73. The auxiliary support means 71 is moved along the axis of the hole 42 by a drive means (not shown) so that the grooves 73 receive the respective projections 27 and 27 of the opposed slide members 21 and 22.

Further disposed under the auxiliary support means 71 is the primary support means 61 similar to the support means 71 having a coaxially disposed bore 62 and diametrically disposed concave grooves 63 which is vertically moved by a drive means (not shown) so that the grooves 63 receives the projections 36 and 36 respectively.

In operation, the central support means 51 is driven upwardly by a drive means (not shown) until upwardly pressing the successive support means 61 and 71 and die frame 41.

The lower surface of the die frame 41 therefore comes into contact with the upper surface of the auxiliary support means 71. Then the lower surface of the auxiliary support means 71 comes into contact with the upper surface of the primary support means 61. Further, the lower surface of the primary support means 61 comes into contact with the upper surface of the central support means 51.

The assembly of the generally base 11 and slide members 21, 22, 31 and 32 therefore compose a substantially cylindrical male die with a protruded portion beyond the surface 32 of the die frame 41.

Over the protruded portion 12, 23, 24, 33 and 34, the female die 100 is disposed to provide a space in which plastic materials such as thermosetting plastic is filled and/or injected from a injection port (not shown).

Figure 4:
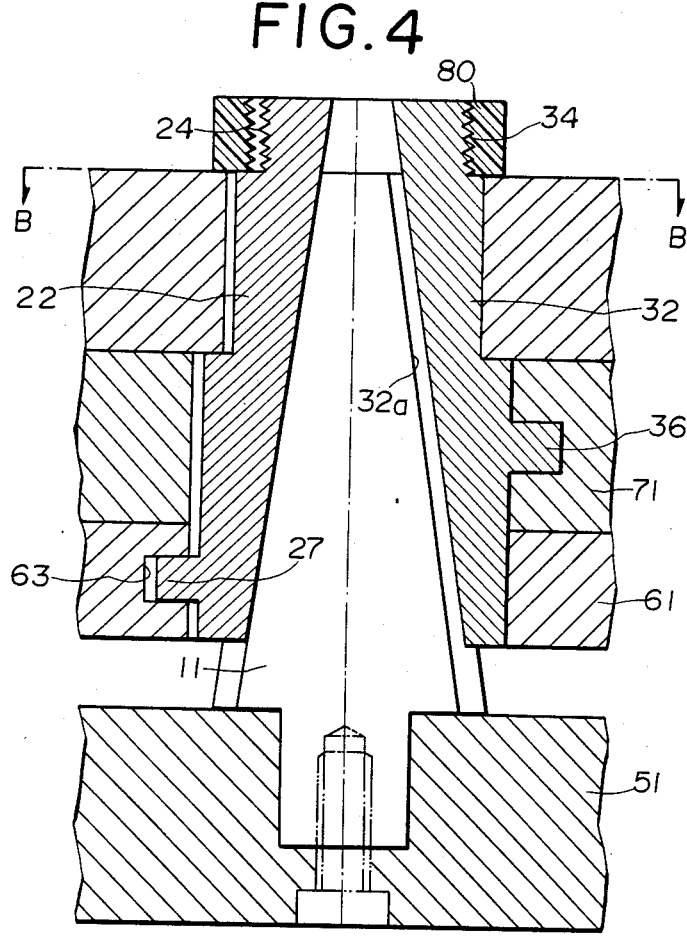
FIG. 4 is a sectional side view of the male die similar to FIG. 3 except that the movement along the X-axis of the primary slide members is completed.

After setting the plastic materials in the space, the female die 100 is upwardly carried along the axis to separate from the finished molding 80. While because of having maximum diameter of the outer sidewall portion longer than minimum diameter of the inner sidewall portion of the molding, the male die assembly when assembled cannot be removed from the opening of the molding 80 and therefore is collapsed as follows:

Maintaining the primary and auxiliary slide members 21, 22, 31 and 32 at predetermined level by the primary and auxiliary support means 61 and 71, the central support means 51 are downwardly driven. Consequently, movement along the Z-axis or downwardly movement of the central base 11 causes the primary slide members 21 and 22 to converge along X-axis under the action of exact engagements between the grooves 13a and 14a and the rails 21a and 22a while release engagements between the grooves 15a and 16a and the rails 31a and 32a prevent the auxiliary slide members 31 and 32 from moving along Y-axis as shown in FIG. 4.

Figure 5:
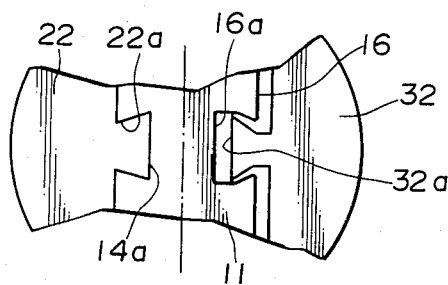
FIG. 5 is an enlarged fragmental horizontal sectional view of the male die taken along the line B—B of FIG. 4.

By moving downwardly the primary suppport means 61, the primary slide members 21 and 22 move downwardly and expand in order to clear and remove the partial protruded portion from the inner sidewall of the molding ring 80 as shown in FIG. 5.

Figure 6:
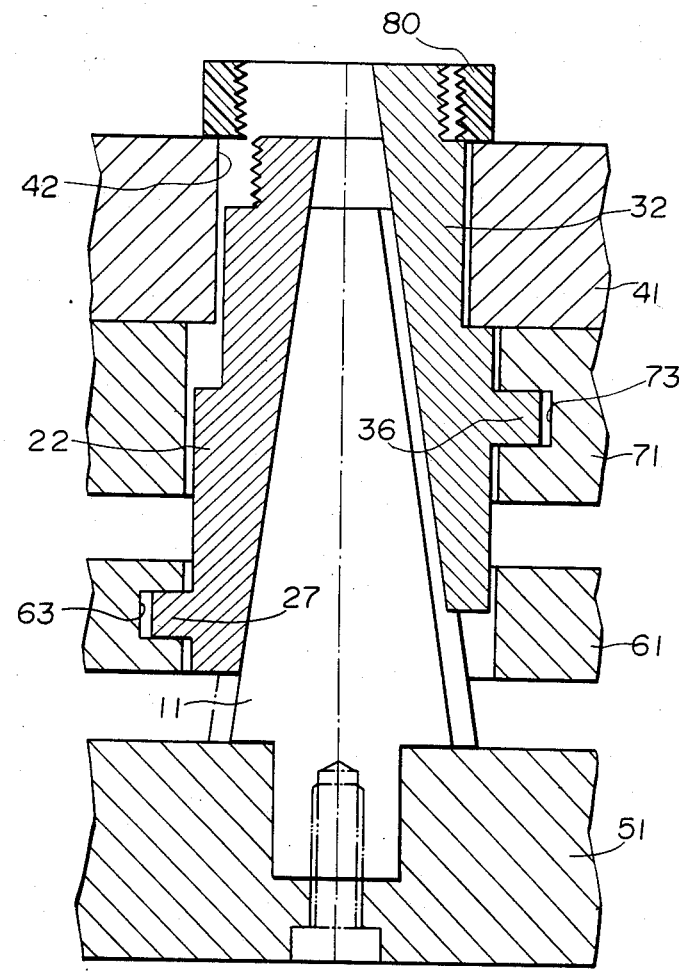
FIG. 6 is a sectional side view of the male die similar to FIG. 3 except that the movement along the Y-axis auxiliary slide members is completed.

At this point, offsets or gaps are formed between the slide contact plane 35 of the slide members 31 and 32 and contact side slope 25 of the slide members 21 and 22. Maintaining the auxiliary support means 71 at that level, the further Z-axial movement of the central base 11 causes the auxiliary slide members 31 and 32 to converge along Y-axis as shown in FIG. 6.

When the auxiliary support means 71 moves downwardly, the primary slide members 31 and 32 move downwardly and expand in order to clear and remove the partial protruded portion from the inner sidewall of the molding produced.

The present invention also relates to a metal mold device for producing a injection molding cap with a partially grooved and or projected inner sidewall.

In this case, in order to prevent plastic material from entering a space formed by the loose engagements between projections and grooves, an additional members or seal plate (not shown) for coverring the top portion of the central base is provided on the top of the central base and loosely connected thereto. The seal plate therefore comprises a disc plate having a diameter less than the minimum diameter of the opening of the molding cap, a vertical rod secured on the center portion of the disc and loosely engaged in a central hole of the base with upper limit.

FIGS. 7a and 7b to 9a and 9b show another embodiments of a male die assembly and a finished plastic molding respectively according to the present invention. Comparable elements are given the same numerals as in FIGS. 1 to 3.

Figure 7A:
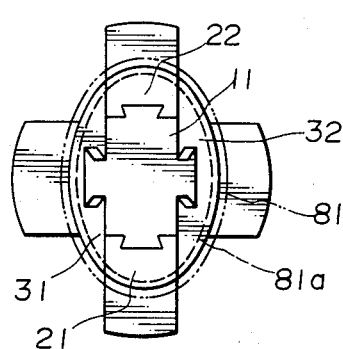
FIG. 7a is a top view of the male die for producing a opening in a molding having a cylindroid inner sidewall and circumferential inner projection thereon.
Figure 7B:
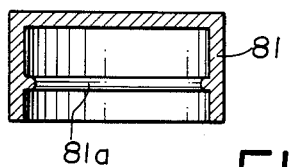

FIG. 7a shows a male die assembly of the metal mold device for producing an elliptically shaped plastic molding cap 81 having an oval inner sidewall with a circumferential inner projection 81a shown in FIG. 7b.

In this case, provided on each pair of the opposed side slopes of the base 11 are closely engaged or loosely engaged projection rails while provided on each pair of opposed slide members are exactly engaged or loosely engaged groove rails.

Figure 8A:
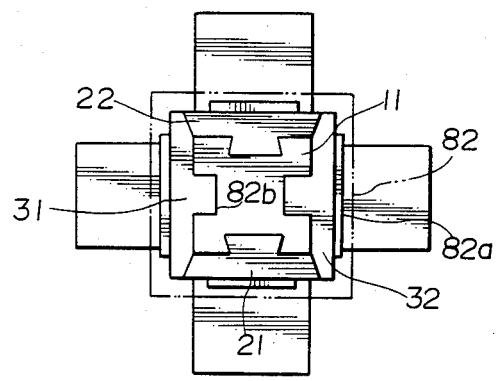
FIG. 8a is a top view of the male die for producing a opening in a molding having a cuboid inner sidewall and circumferential inner grooves therein.
Figure 8B:
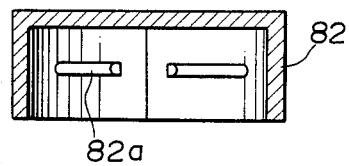

FIG. 8a shows a male die assembly of the metal mold device for producing a rectangularly shaped plastic molding cap 82 having a cuboid inner sidewall with a plurality of grooves 82a horizontally arranged along circumferential inner sidewall shown in FIG. 8b.

Provided on each of opposed slide members 31 and 32 is rectangular sectional projection rail 82b instead of loosely engaged projection rail while provide on the each of corresponding pair of the side slopes of the base 11 is rectangular sectional groove rail instead of loosely engaged wedge rail.

Figure 9A:
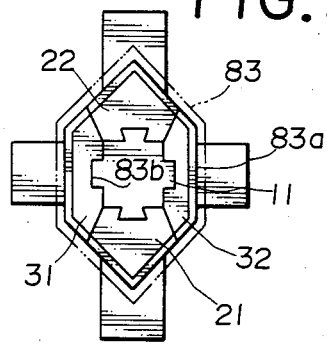
FIG. 9a is a top view of the male die for producing a opening in a molding having a hexagonal inner sidewall and circumferential inner groove therein.
Figure 9B:
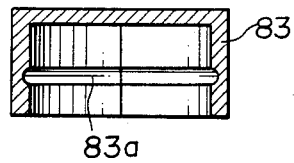

FIG. 9a shows a male die assembly of the metal mold device for producing a hexagonally shaped plastic molding cap 83 having a hexagonal inner sidewall with a circumferential groove 83a shown in FIG. 9b.

Similar to FIGS. 7a and 8a, provided on each of opposed slide members 31 and 32 is acurate and rectangular sectional groove rail 83b while provided on each of corresponding pair of the side slopes of the base 11 is acurate and rectangular sectional projection rail to conform that of the respective slide members 31 and 32.

It is further understood by those skilled in the art that foregoing description are preferred embodiments of disclosed device and that various changes and modifications may be made in the invention without departing from the sprit and scope thereof.

For example, a metal mold device may comprise a horizontally movable female die, a horizontally movable die frame having a hole and a male die assembly which includes a fixed base, a pair of horizontally and radially movable primary slide members, a pair of horizontally and radially movable auxiliary slide members. The male die assembly may inserted through the hole of the die frame so that the threaded portions protrude beyond a vertical plane of the frame.

What is claimed is:

1. A metal mold device which comprises a female die for providing a profile of a molding, a die frame having a hole and a divisional male die assembly protruded through the hole of the die frame, characterized in that the divisional male die assembly comprises:
   a central base having a rectangular top and four side slopes, each opposed pair having common individual gradient angles or a common angle and moving along the axis between a molding position and a removing position;
   a pair of opposed primary slide members strictly moved along the axis on the opposed corresponding side slopes of the base respectively and each primary slide member comprising a primary slide contact plane, for contacting said side slopes, a partial convexo-concave sidewall component and a pair of side planes;
   a pair of opposed auxiliary slide members loosely moved along the axis on the corresponding remained slide slopes of the base respectively, each auxiliary slide member comprising a remained convexo-concave sidewall component and a secondary slide contact plane for contacting said side plane and slide slopes upon assembling said male die assembly; said partial and remained convexo-concave sidewall components completely defining an inner sidewall of said molding;
   central support means for carrying the base and threadly secured on the bottom of the base;
   primary support means for carrying the primary slide members; and auxiliary support means for carrying the auxiliary slide members.

2. A metal mold device of claim 1, wherein:
the base and the slide members are so arranged that the rectangular top of the base is aligned with the top of the slide members respectively to produce a bottom of the opening of the molding and that sidewall of the slide member is aligned with the sidewall of the adjacent slide member so as to produce an inner sidewall of the molding having covexo-concave surface upon assembling.

3. A metal mold device of claim 2, wherein:
after producing and thermosetting the synthetic molding, when the central support means for carrying the central base downwardly moves to the intermediate position from the molding position, the opposed primary slide members inwardly radially move along X-axis until the outer sidewall portions of the slide members having maximum diameter cannot touch the corresponding inner sidewall portions of the finished molding having minimum diameter.

4. A metal mold device of claim 3, wherein:
the primary slide members are downwardly and outwardly radially moved by downwardly moving the primary support means.

5. A metal mold device of claim 4, wherein:
the central base further moves from the intermediate position to the removing position, the auxiliary slide members inwardly radially move along Y-axis until the outer sidewall portions of the auxiliary slide members having maximum diameter cannot touch the corresponding inner sidewall portions of the finished molding having minimum diameter, then the auxiliary slide members being downwardly and outwardly radially moved by downwardly moving the auxiliary support means.

6. A metal mold device of claim 1, wherein:
the molding having a blind hole can be easily removed from a male die even if nominal diameter of the sidewall adjacent to lower rim thereof is smaller than that of the sidewall adjacent to the bottom.

7. A metal mold device of claim 6, wherein:
the male die assembly of the base, primary auxiliary slide members is so disposed that Z-axial movement of the base is converted with sequential 3 dimensional movements of the slide members, that is, X-axial movement of the primary slide members, Z-axial movement of the primary slide members, Y-axial movement of the auxiliary slide members and Z-axial movements of the auxiliary slide members.

* * * * *